Dec. 22, 1931.  C. L. McGAVERN  1,837,978
TRANSMISSION CONTROL
Filed April 13, 1931  3 Sheets-Sheet 1
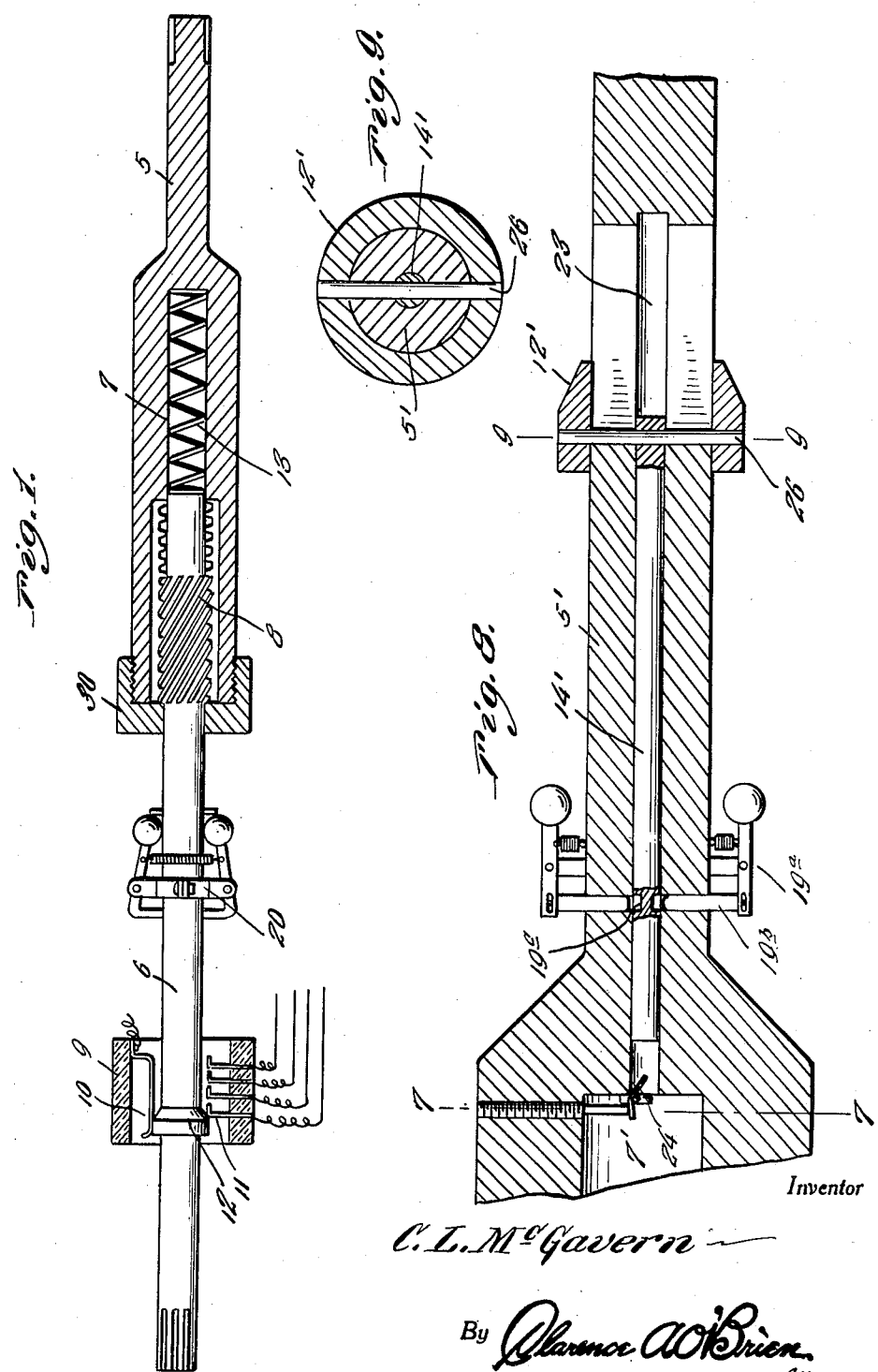
Inventor
C. L. McGavern
By Clarence A. O'Brien
Attorney

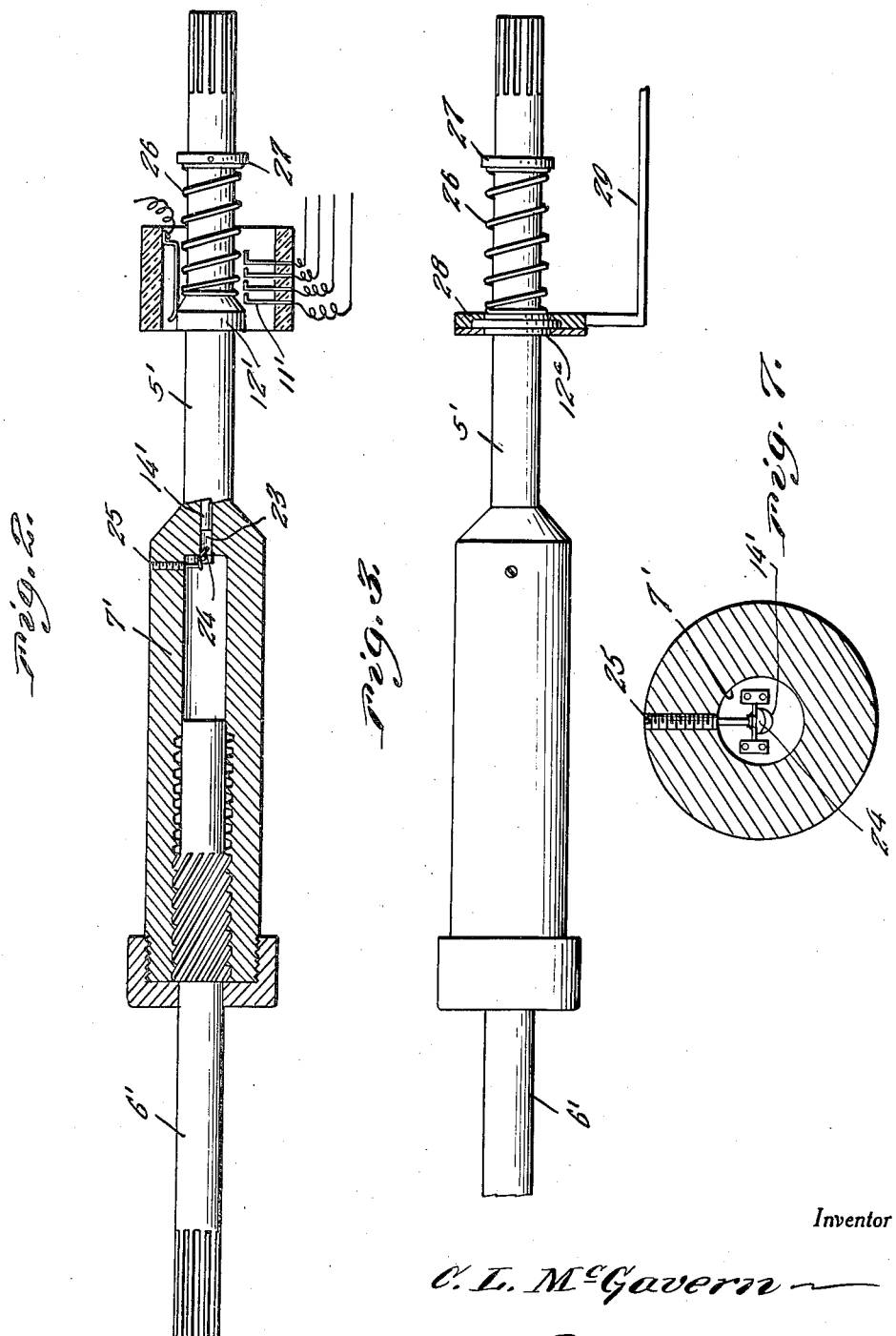

Dec. 22, 1931.  C. L. McGAVERN  1,837,978
TRANSMISSION CONTROL
Filed April 13, 1931   3 Sheets-Sheet 3
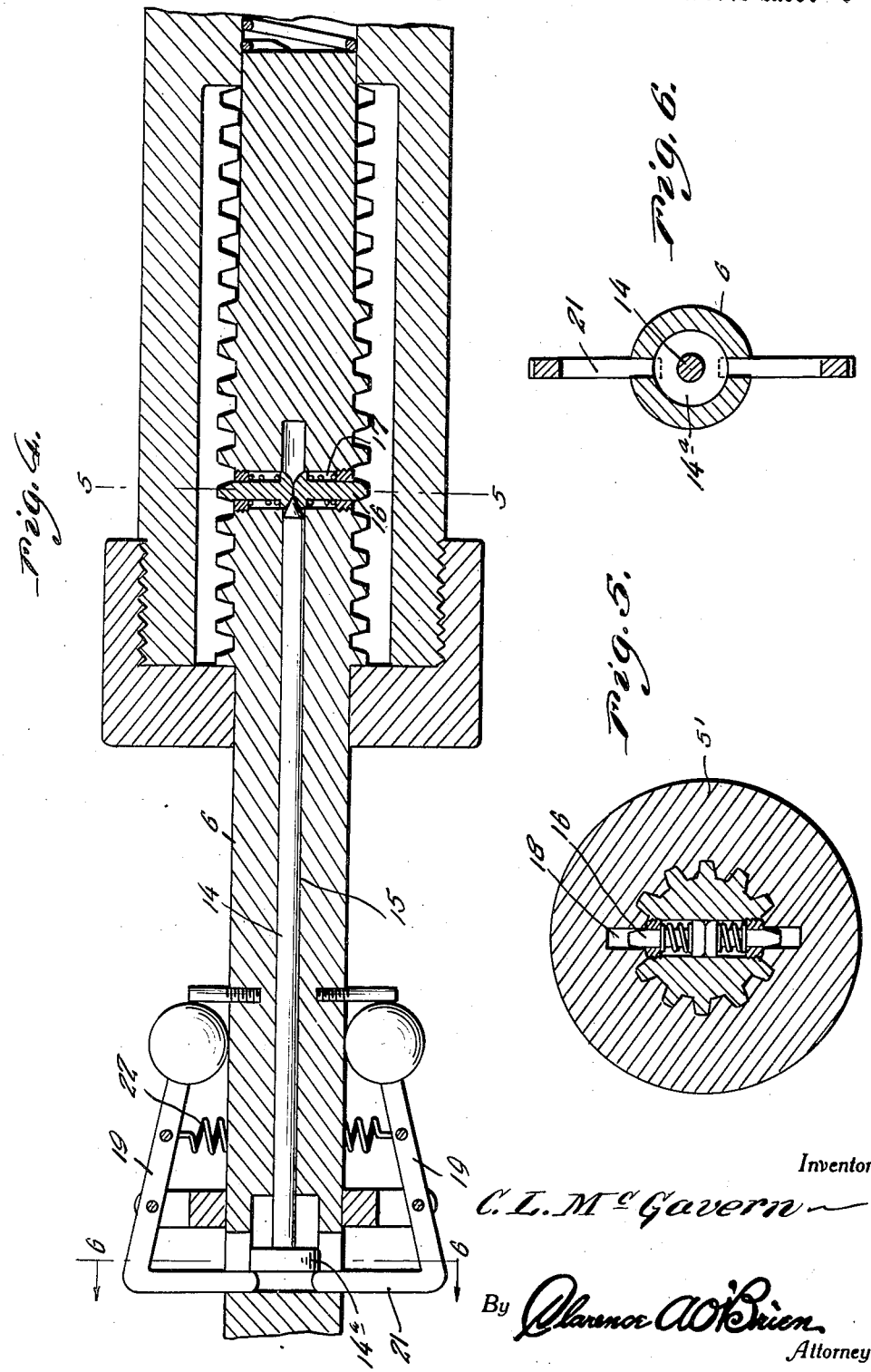
Inventor
C. L. McGavern
By Clarence A. O'Brien
Attorney Patented Dec. 22, 1931

1,837,978

UNITED STATES PATENT OFFICE

CHARLES L. McGAVERN, OF OLEAN, NEW YORK

TRANSMISSION CONTROL

Application filed April 13, 1931. Serial No. 529,846.

This invention relates broadly to a control means for the transmission of motor driven vehicles as for example automobiles, buses and the like and the primary object of this invention is to provide means to utilize the load on the drive shaft for effecting an automatic operation of the transmission for effecting a shift from one speed to another without requiring the attention of the operator of the vehicle.

A still further object of the invention is to provide means for utilizing the load to effect an automatic shift from a higher to a lower speed while the vehicle is at rest so that the "pick-up" or initial start of the vehicle will be attained at the necessary high, low or intermediate speed without the necessity of manual control of the transmission.

Other objects and advantages of the invention will become apparent from a study of the following description, taken in connection with the accompanying drawings wherein:

Figure 1 is a longitudinal sectional elevational view of one form of the invention.

Figure 2 is a view similar to Figure 1 of a second form of the invention.

Figure 3 is an elevational view of a third form of the invention.

Figure 4 is a longitudinal sectional elevational view through the structure shown in Figure 1 for more clearly disclosing governor means forming part of the invention.

Figures 5 and 6 are transverse sectional views taken substantially on the line 5—5 and 6—6 respectively of Figure 4.

Figure 7 is a sectional view taken substantially on the line 7—7 of Figure 8.

Figure 8 is a fragmentary longitudinal sectional elevational view of that form of the invention shown in Figure 2.

Figure 9 is a transverse sectional view taken substantially on the line 9—9 of Figure 8.

Referring more in detail to the drawings, it will be seen that I provide a sectional shaft adapted to be arranged between the transmission and differential, and including sections 5 and 6, the section 5 being located toward the load end. Shaft 5 at one end is provided with an axial socket and at the inner end of the socket is provided with a chamber 7. Adjacent its outer end, the socket is provided with internal splines cooperable with splines formed on the end of the shaft 6 journalled in the socket of the shaft 5. The splines designated generally by the reference character 8 may be at any desired pitch sufficient for causing an axial movement of the shaft 6 relative to the shaft 5.

That form of the invention shown in Figure 1 is especially adapted for controlling an electrically operable transmission, and to this end, it will be seen that circumjacent the shaft 6 is an insulated annulus 9 in which is mounted a control for the transmission and which includes in the present instance for the sake of example, a main contact 10 and four speed contacts 11 for high, third, second and first speeds counting from the left to the right in Figure 1.

On the shaft 6 is a brush 12 normally engaged with the contact 10 and adapted to be engaged with successive contacts 11 according to the load on shaft 5.

To provide a locked drive between the shafts 5 and 6, there is provided in the chamber 7 of the socket a coil spring 13 so that obviously as shaft 5 is rotated, causing shaft 6 to move inwardly of the socket, the spring 13 will be compressed to provide a locked drive between the shafts 5 and 6.

As is well known, when travelling in a high speed, an increase in the load on shaft 5 would cause a perceptible movement of shaft 6 relative to shaft 5 which would possibly result in the brush 12 engaging a lower speed contact 11. To obviate this possibility, or as is known in the art "a gig back" toward low when travelling at high speed suitable means may be provided and controlled by the speed of the shaft 6 for locking the shafts 5 and 6 with shaft 6 held against axial movement relative to the shaft 5 upon the happening of such a contingency. Such means includes in the present instance a plunger rod 14 operable in an axial socket 15 provided in shaft 6. Plunger 14 is adapted to control a pair of oppositely extending dogs 16 adapted for sliding movement in radial guides 17 provided adjacent the threaded end of shaft 6, and these dogs 16 are spring pressed being normally urged inwardly to engage with the conical end of the plunger 14. For receiving the dogs 16, when the latter are forced radially outwardly under action of plunger 14 there are provided in the socket of the shaft 5 key-ways or grooves 18. The governor means for controlling the plunger 14 may be of any conventional construction and include weighted arms 19 that are oppositely disposed and pivotally mounted on a suitable supporting clamp 20 embracing the shaft 6. The arms 19 remote from their weighted ends are provided with inwardly directed extensions or terminals 21 that extend inwardly of a transverse opening provided in the shaft 6 for engaging a head 14a provided on the plunger 14. Suitable spring devices 22 are provided for normally urging the weighted ends of the arms inwardly toward the shaft 6.

The operation of the locking means may be briefly described as follows: Assuming for example, that the automobile is travelling in high speed at, say, a rate of thirty miles an hour, the operator suddenly increases the speed so as to attain a rate of speed approximating say forty miles an hour. Consequently the load on shaft 5 is increased which would have a tendency because of the connection between shafts 5 and 6 to cause shaft 6 to move relative to shaft 5 with the result that the brush 12 closing the circuit between the contact 10 and that contact 11 controlling the high speed would be moved, possibly out of engagement with the high speed contact 11 to the third speed contact 11 which of course would be objectionable. However, through the medium of the device just described, when the rate of speed of the vehicle is so increased, the arms 19 against the action of the springs 22 and because of centrifugal force, will be swung about their pivots outwardly from shaft 6 causing the ends 21 to move inwardly forcing plunger 14 to the right in Figure 4 and plunger 14 engaging the inner ends of the dogs 16 will force the latter radially outwardly and into engagement with the keyways 18 for retaining the shaft 6 against axial movement relative to the shaft 5.

On the other hand, as the speed of the shaft decreases beyond a predetermined rate, the ends 21 of governor arms 19 move out of engagement with head 14a releasing dogs 16 which permit shaft 6 to move relative to shaft 5 for effecting an automatic shift from a high to a lower speed.

The operation of the device as thus described is thought apparent, attention being called to the fact, that initially the brush 12 is adjacent the high speed contact 11. Thus when starting the motor, the circuit between contact 10 and high speed contact 11 will be first closed and if the power in high speed is not sufficient to start or "pick-up" increased speed of the motor will increase the load on shaft 6 causing the same to move further inwardly or to the right in Figure 1 for closing the circuit between contact 10 and the next or third speed contact 11. Such an operation will continue until the necessary speed required for the load is attained, and upon attaining the desired speed, that is, high, third, second or first, the vehicle will get under power. After the initial movement of the automobile, and as the load decreases, it is obvious that shaft 6 will move in an opposite direction relative to the shaft 5 to ultimately close the circuit between speed contact 11 as found desirable. In this connection it will be noted that the device is designed for automatically controlling the several forward speeds, reverse speed being manually controlled.

Instead of spring 13, chamber 7' is adapted to contain a suitable fluid such as oil, gas, compressed air or the like. In this form of the invention it will be also noted, that the governor may be dispensed with, and in lieu thereof there is provided in the shaft 5' an axial socket 23 and at that end of the socket connecting with the chamber 7' there is provided a hinged valve 24 that is adjustable through the medium of a suitable adjusting screw 25 threadedly engaged with the socket of shaft 5'. Arranged within the socket 23 is a plunger 14' that has keyed thereto as at 26 the brush 12'. In this connection it will be also noted that the contact carrying member 9 is disposed circumjacent the shaft 5'.

It will be also noted, that the device provides for the shifting from a lower to a high speed, or vice versa through successive changes of speed, that is to say the device provides for a shifting automatically successively through four speed changes, so that when going from high into the lower speed, the speed changes from high, to third, thence into second and finally into low, and when going from a low to a high speed there is effected a change from the lowest to the second speed from the second to the third speed and finally from the third speed to the fourth or highest speed, with the result that there is no such change of speed of the vehicle and all possible jarring and injury to the mechanism is thus obviated.

In this form of the invention, it will be also noted that a spring 26 is convoluted about the shaft 5' and is interposed between the brush 12' and a fixed collar 27 on the shaft 5', spring 26 acting on the plunger 14' by reason of its engagement with the brush 12' to normally urge plunger 14' toward the left in Figure 2 in opposition to the pressure of the fluid exerted upon the plunger 14', as the load on the shaft increases. The operation of this form of the invention is as follows: When the motor is started, for providing a load on the shaft, shaft 6' will move inwardly relative to the shaft 5' compressing the fluid in the chamber 7' providing a locked drive between the shaft section, and the fluid compressed in chamber 7' will exert a force on the plunger 14' for shifting the latter toward the right in Figure 2 so that brush 12' will initially engage with the high speed contact 11, and as the load increases successively engage said contact 11 until the proper speed is attained.

The valve 24 controlling communication between chamber 7' and the socket 23 will operate to check "gig-back" toward high when shifting toward low speed as the transmission gears pass between shifts.

Where a liquid or gas is used in the chamber 7' it may be necessary to use both the valve 24 and a suitable centrifugal governor operatively connected with the plunger 14' and in this connection, attention being directed to Figure 8, it will be seen that on the shaft 5' I provide a somewhat conventional type of governor designated generally by the reference character 19a, the weighted arms of which have pin and slot connections with radially movable dogs or keys 19b operable in radial openings provided in the shaft 5' and at their inner ends adapted to engage notches 19c provided in the plunger rod 14', the purpose of the governor for controlling the plunger rod 14' being to prevent "gig-back" toward low when travelling in high, and consequently will operate only while the shaft is turning at high speed.

That form of the invention shown in Figure 3 is substantially the same as that shown in Figure 2, with the exception that the device is herein shown as being capable of controlling a mechanically operated transmission and in this connection, it will be noted that for the brush 12' there is substituted a shiftable collar 12a with which is engaged as at 28 a suitable control rod 29 adapted to be connected with a conventional type of transmission in any suitable manner.

It is to be also understood, that though I have shown in that embodiment of the invention illustrated in Figure 1 as controlling an electrically operable gear shift mechanism, it is to be understood that instead of such electrically operable transmission being controlled thereby a mechanical transmission may be also controlled by this form of the invention, such being thought apparent.

For locking the shaft sections when the gears are in reverse, in each form of the invention, at the socketed end of the shaft section 5, 5' there is provided a stuffing box 30, it being understood, and as hereinbefore stated, the reverse shift is manually controlled by suitable mechanism not shown and well known in the art.

As will also be apparent to those skilled in the art, the device, in either of the forms herein shown, is capable of adaptation to electric motors to substitute for the starter in picking up the load, the operation in this connection being substantially the same as herein described with reference to the device being used between the transmission and differential of an automobile.

Even though I have herein shown and described the preferred embodiments of the invention, it is to be understood that the invention is susceptible of further changes, modifications and improvements coming within the scope of the appended claims.

Having thus described my invention, what I claim as new is:

1. In a transmission control, the combination of a drive shaft and a driven shaft, said drive shaft at one end provided with a socket having a chamber at the inner end thereof, said driven shaft having one end journalled in said socket, splines connecting said shafts, a compressible medium arranged in said chamber and acting on said driven shaft for normally urging the same in one direction relative to the drive shaft, governor control means for uniting said shafts against rotative movement relative to one another, and means controlled by one of said shafts and operable to control the transmission for effecting a change of speed in accord with the load on the drive shaft.

2. In a transmission control, a drive shaft and a driven shaft alined therewith, splines for connecting said shafts and to effect a movement of the driven shaft axially relative to the drive shaft, means operable upon axial movement of the driven shaft relative to the drive shaft to provide a locked drive between the shafts, governor control means locking the driven shaft to the drive shaft to retain said driven shaft against rotation relative to the drive shaft, and means controlled by the driven shaft for controlling the transmission to effect a change of speed in accord with the variations of the load on the drive shaft.

3. In a transmission control, a drive shaft and a driven shaft alined therewith, splines for uniting said shafts to effect an axial movement of the driven shafts relative to the drive shaft, said drive shaft provided with an axial bore, a plunger operable in the bore, said drive shaft provided with a chamber, a compressible medium in the chamber between said plunger and said driven shaft, and means controlled by the plunger for controlling the transmission for effecting a change of speed in accord with the load on the drive shaft.

4. In a transmission control, a drive shaft and a driven shaft alined therewith, splines for uniting said shafts to effect an axial movement of the driven shaft relative to the drive shaft, said drive shaft provided with an axial bore, a plunger operable in the bore, said drive shaft provided with a chamber, and a compressible medium in the chamber between said plunger and said driven shaft, and means controlled by the plunger for controlling the transmission for effecting a change of speed in accord with the load on the drive shaft, said last mentioned means including a member shiftable on the drive shaft, means keying said member to said plunger for movement with the plunger, yieldable means acting on said member oppositely to the compressible medium arranged in said chamber, and a transmission control device operatively connected with said member.

5. In a transmission control, a drive shaft and a driven shaft alined therewith, splines for uniting said shafts to effect an axial movement of the driven shaft relative to the drive shaft, said drive shaft provided with an axial bore, a plunger operable in the bore, said drive shaft provided with a chamber, and a compressible medium in the chamber between said plunger and said driven shaft, and means controlled by the plunger for controlling the transmission for effecting a change of speed in accord with the load on the drive shaft, said last mentioned means including a member shiftable on the drive shaft, means keying said member to said plunger for movement with the plunger, yieldable means acting on said member oppositely to the compressible medium arranged in said chamber, and a transmission control device operatively connected with said member, and adjustable valve means controlling communication between said chamber and said bore.

In testimony whereof I affix my signature

CHARLES L. McGAVERN.